(12) United States Patent
Breeds et al.

(10) Patent No.: US 9,136,071 B2
(45) Date of Patent: Sep. 15, 2015

(54) OVERLAY FOR AN ELECTRICAL SWITCH

(75) Inventors: Robert J. Breeds, Winchester (GB);
Maurice F. Gray, Winchester (GB);
James S. Taylor, Hampshire (GB)

(73) Assignee: International Business Machines Corporation, Armonk, NY (US)

(*) Notice: Subject to any disclaimer, the term of this patent is extended or adjusted under 35 U.S.C. 154(b) by 448 days.

(21) Appl. No.: 13/490,837

(22) Filed: Jun. 7, 2012

(65) Prior Publication Data

US 2012/0312669 A1    Dec. 13, 2012

(30) Foreign Application Priority Data

Jun. 10, 2011  (EP) .................................. 11169509

(51) Int. Cl.
| H01H 9/04 | (2006.01) |
| H01H 9/16 | (2006.01) |
| H01H 13/06 | (2006.01) |
| B29C 45/14 | (2006.01) |
| H01H 23/06 | (2006.01) |
| B29C 43/02 | (2006.01) |

(52) U.S. Cl.
CPC ............... H01H 9/161 (2013.01); H01H 9/168 (2013.01); H01H 13/06 (2013.01); B29C 43/02 (2013.01); B29C 45/14 (2013.01); H01H 23/06 (2013.01); H01H 2009/048 (2013.01); H01H 2009/164 (2013.01); H01H 2215/03 (2013.01); H01H 2225/002 (2013.01); H01H 2239/006 (2013.01); Y10T 29/49002 (2015.01)

(58) Field of Classification Search
CPC .................. H01H 2239/006; H01H 2009/048; H01H 2215/03; H01H 23/06; H01H 9/168; H01H 9/161; H01H 2225/002; H01H 2009/164; H01H 13/06

USPC ........ 200/302.2, 302.1, 302.3, 331, 280–281, 200/284, 292, 51.12, 51.06, 51.03

See application file for complete search history.

(56) References Cited

U.S. PATENT DOCUMENTS

| 4,145,588 | A | * | 3/1979 | Orcutt ........................... 200/83 P |
| 6,040,536 | A | * | 3/2000 | Miller et al. ................. 200/83 N |
| 6,635,838 | B1 | * | 10/2003 | Kornelson .................... 200/341 |
| 6,642,460 | B2 | | 11/2003 | Dunne et al. |
| 7,880,107 | B1 | * | 2/2011 | Srbinovski et al. ........... 200/406 |
| 8,158,899 | B2 | * | 4/2012 | Bloch ......................... 200/302.2 |
| 8,253,048 | B2 | * | 8/2012 | Ozias et al. ................... 200/314 |
| 8,525,055 | B2 | * | 9/2013 | Brazier et al. ............... 200/83 R |
| 8,598,478 | B2 | * | 12/2013 | Buss ............................. 200/61.7 |
| 8,735,755 | B2 | * | 5/2014 | Peterson et al. .............. 200/600 |
| 2009/0288937 | A1 | | 11/2009 | Agronin et al. |
| 2010/0079289 | A1 | | 4/2010 | Brandt et al. |

FOREIGN PATENT DOCUMENTS

| EP | 0653769 A1 | 5/1995 |
| EP | 1791148 B1 | 10/2008 |
| EP | 2028677 A2 | 2/2009 |

* cited by examiner

*Primary Examiner* — Edwin A. Leon
(74) *Attorney, Agent, or Firm* — Yee & Associates, P.C.; Parashos Kalaitzis

(57) ABSTRACT

A flexible resilient member at least partially overlying an electrical switch, and attached to an external surface of the switch, comprises at least one signalling component operable on operation of the underlying switch. The member may be in the form of a membrane, for example, formed of an elastomeric material. The signalling component may emit wireless signals which may be received by a monitoring component.

14 Claims, 5 Drawing Sheets

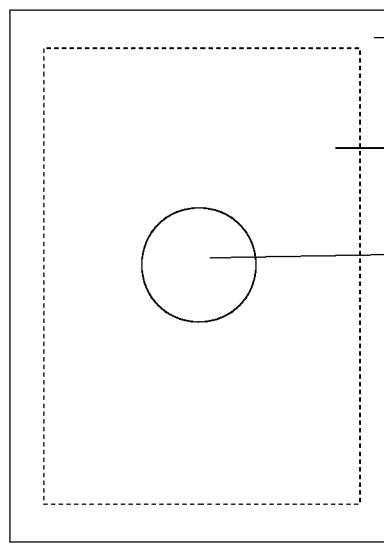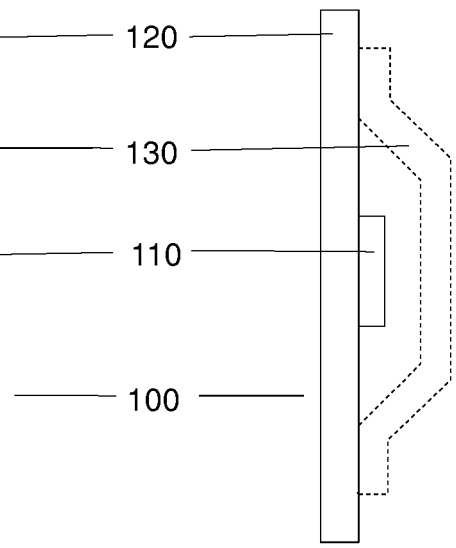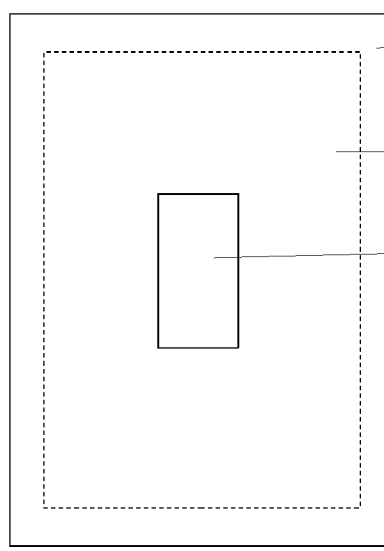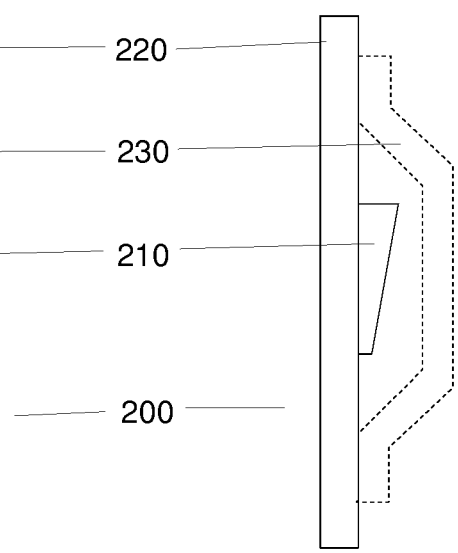

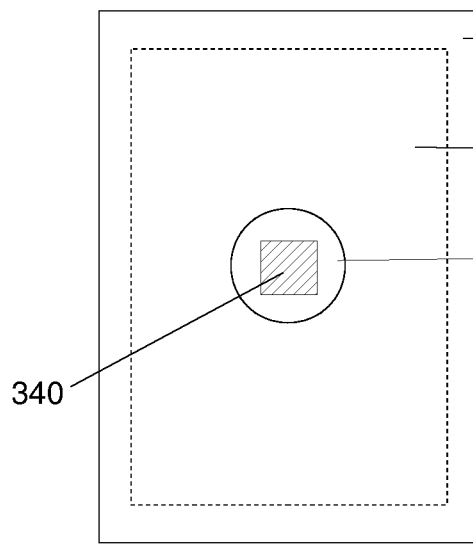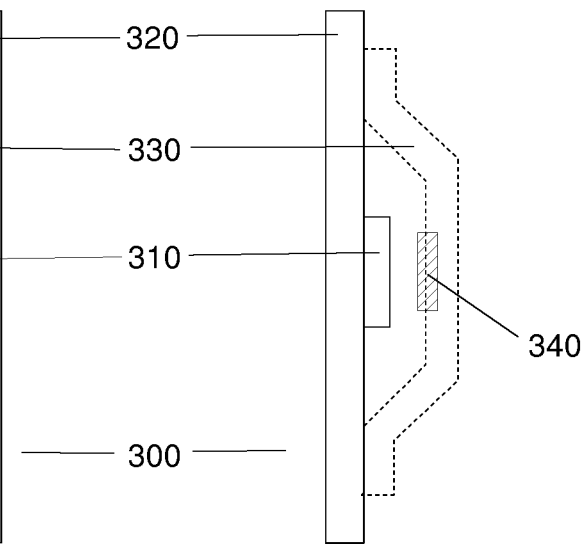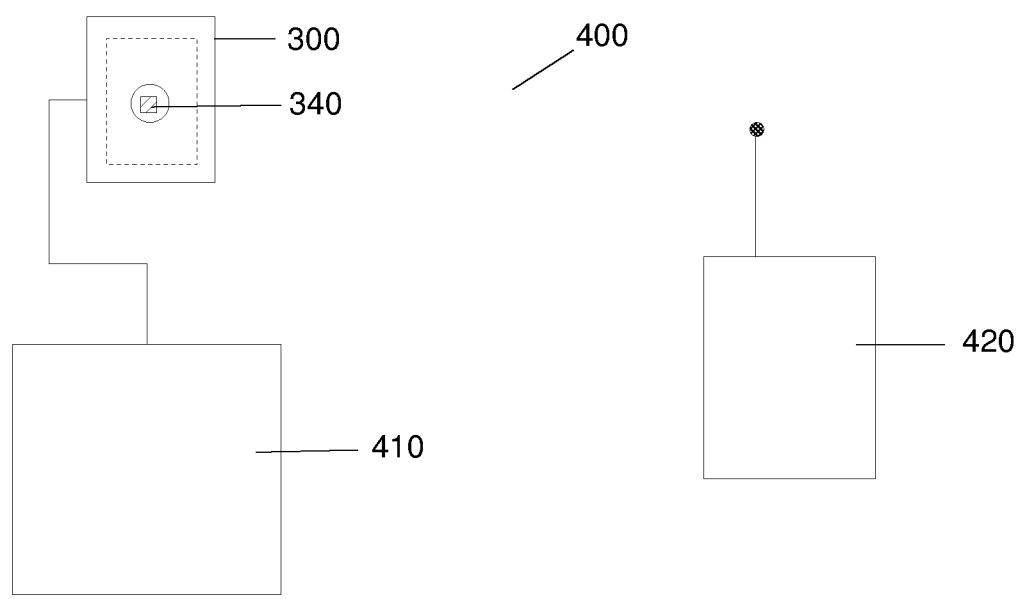

OVERLAY FOR AN ELECTRICAL SWITCH

The invention relates to an overlay for an electrical switch. More particularly, the invention relates to an overlay for an electrical switch wherein the overlay incorporates added functionality.

BACKGROUND OF THE INVENTION

It is known to provide flexible overlays for electrical switches for protection against, for example, the ingress of water when the switch is operating in damp or humid conditions. Such overlays serve a protective function.

FIG. 1a illustrates a plan view and FIG. 1b a cross-sectional elevation view of a pushbutton switch 100 as known in the prior art incorporating pushbutton 110 for switch operation, faceplate 120 and protective membrane overlay 130.

FIG. 2a illustrates a plan view and FIG. 2b a cross-sectional elevation view of a rocker switch 200 as known in the prior art incorporating rocker 210 for switch operation, faceplate 220 and protective membrane overlay 230.

An example of a switch incorporating such a protective overlay is described in European patent no. EP 653769 B1. The electrical switch of this patent is a rocker switch with a front protection cap which does not inhibit the normal operation of the switch, but which provides protection for the inner workings of the switch from conditions of high humidity or in the presence of liquids.

It would be desirable to address shortcomings of known electrical switches and overlays to incorporate additional functions.

SUMMARY OF THE INVENTION

Viewed from a first aspect, the present invention provides a flexible resilient member at least partially overlying an electrical switch and attached to the external surface of the switch, characterised in that the member comprises at least one signalling component operable on operation of the underlying switch. An advantage of this feature is that notification is given of a change of the operating state of the switch.

Preferably, the present invention provides a flexible resilient member which wholly overlies the electrical switch. An advantage of this feature is that operation of the underlying switch is not possible without removing the flexible resilient member.

Preferably, the present invention provides a flexible resilient member which is sealed to protect the electrical switch against foreign matter. An advantage of this feature is that the switch is protected from foreign matter such as liquids.

Preferably, the present invention provides a flexible resilient member which comprises an elastomeric material. An advantage of this feature is that the member may be flexed without sustaining damage and may be manufactured by, for example, moulding to the required shape.

Preferably, the present invention provides a flexible resilient member which comprises a signalling component which is operable to produce a wireless signal. An advantage of this feature is that a change of the operating state of the underlying switch may be monitored at a distance and out of site of the monitored switch.

Preferably, the present invention provides a flexible resilient member which comprises a signalling component comprising a light. An advantage of this feature is that a change of the operating state of the underlying switch may be monitored without the need for external monitoring equipment and may be perceived visually.

Preferably, the present invention provides a flexible resilient member which comprises a signalling component comprising a component producing an audible signal. An advantage of this feature is that a change of the operating state of the underlying switch may be monitored without the need for external monitoring equipment, and may be perceived audibly and so without the need for the switch to be visible.

Preferably, the present invention provides a flexible resilient member which comprises a signalling component in which the underlying switch is a pushbutton switch. An advantage of this feature is that a change of state of a pushbutton switch may be signalled. Preferably, the present invention provides a flexible resilient member which comprises a signalling component in which the underlying switch is a rocker switch. An advantage of this feature is that a change of state of a rocker switch may be signalled.

Preferably, the present invention provides a flexible resilient member in which the flexible resilient member wholly overlies the electrical switch apart from a tool-shaped hole allowing access by a complementary tool for operation of the underlying switch. An advantage of this feature is that a specific tool is required for operation of the underlying switch, restricting use to authorized personnel.

Preferably, the present invention provides a flexible resilient member comprising a signalling component in which the signalling component is positioned so as to be operable when the underlying switch is operated to disconnect electrical power from the electrical load controlled by the switch; or in which the signalling component is positioned so as to be operable when the underlying switch is operated to connect electrical power to the electrical load controlled by the switch. An advantage of this feature is that disconnection of power from an electrical load and connection of power to an electrical load may both be signalled.

Viewed from a second aspect, the present invention provides a system for monitoring a change of the operational state of an electrical switch comprising a flexible resilient member incorporating at least one signalling component, in which a monitoring component is operable to receive a signal emitted by the signalling component. An advantage of this feature is that a switch or several switches may be monitored from a control point.

Preferably, the present invention provides a system in which the monitoring component comprises a wireless receiver. An advantage of this feature is that all monitored switches within wireless range of the wireless receiver may be monitored.

Viewed from a third aspect, the present invention provides a method of manufacture of a flexible resilient member comprising a signalling component in which the method comprises a moulding process. An advantage of this feature is that the process of moulding may be used to manufacture the member.

Preferably, the present invention provides a method of moulding in which the moulding process is compression moulding. An advantage of this feature is that the process of compression moulding may be used to manufacture the member.

Preferably, the present invention provides a method of moulding in which the moulding process is injection moulding. An advantage of this feature is that the process of injection moulding may be used to manufacture the member.

Preferably, the present invention provides a method of moulding in which the moulding process is blow moulding. An advantage of this feature is that the process of blow moulding may be used to manufacture the member.

Viewed from a fourth aspect, the invention provides a method of manufacture of a flexible resilient member comprising a signalling component in which the method comprises a mechanical fabrication process. An advantage of this feature is that a process of fabrication may be used to manufacture the member.

BRIEF DESCRIPTION OF THE DRAWINGS

A preferred embodiment of the present invention is described below, by way of example only, with reference to the following drawings.

FIG. 1a is a plan view of a pushbutton switch with a membrane overlay as known in the prior art;

FIG. 1b is a cross-sectional elevation view of a pushbutton switch with a membrane overlay as known in the prior art;

FIG. 2a is a plan view of a rocker switch with a membrane overlay as known in the prior art;

FIG. 2b is a cross-sectional elevation view of a rocker switch with a membrane overlay as known in the prior art;

FIG. 3a is a plan view of a pushbutton switch with an at least partially overlying flexible resilient member incorporating a signalling device, in accordance with a preferred embodiment of the invention;

FIG. 3b is a cross-sectional elevation view of a pushbutton switch with an at least partially overlying flexible resilient member incorporating a signalling device, in accordance with a preferred embodiment of the invention;

FIG. 4 illustrates a system incorporating the pushbutton switch with a membrane overlay incorporating a signalling device in accordance with a preferred embodiment of the invention;

DETAILED DESCRIPTION OF THE INVENTION

Figure 5A:
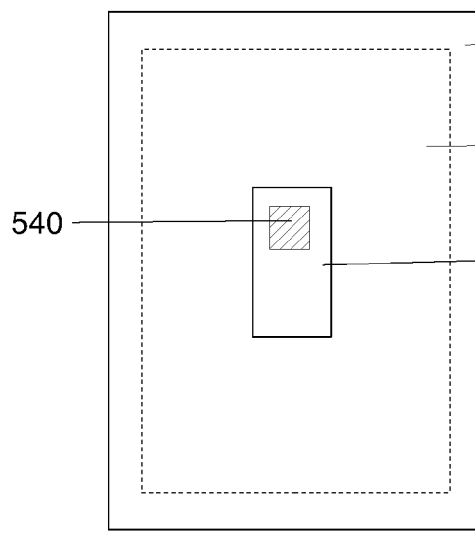
FIG. 5a is a plan view of a rocker switch with a membrane overlay incorporating a signalling device in accordance with a preferred embodiment of the invention.

FIG. 1a illustrates a plan view and FIG. 1b illustrates a cross-sectional elevation view of a prior art pushbutton switch 100 comprising a pushbutton 110 operating within a faceplate 120, the whole being covered by a protective membrane 130. In operation, a user may operate the pushbutton 110 by depressing the center of membrane 130 above the pushbutton. Membrane 130 flexes to allow depression of the underlying pushbutton 110 and to operate the switch to change the state of the controlled electrical load.

FIG. 2a illustrates a plan view and FIG. 2b a cross-sectional elevation view of alternative prior art comprising a rocker switch of the type used, for example, to turn lights on and off, or to turn on or off electrical supply wall sockets. Rocker switch 200 comprises rocker component 210 operating within faceplate 220, the whole being covered by protective membrane 230. In operation, a user may operate the rocker component 210 by depressing the membrane 230 above the end of the rocker component 210 to be operated.

In accordance with a preferred embodiment of the invention, FIG. 3a illustrates a plan view and FIG. 3b a cross-sectional elevation view of a pushbutton switch 300 comprising a pushbutton 310 operating within faceplate 320, the whole being substantially covered by a flexible resilient member in the form of membrane overlay 330. Membrane 330 incorporates signalling component 340 positioned substantially over the operating surface of pushbutton 310 of switch 300, so that operation of the underlying pushbutton 310 by application of pressure to membrane 330 in the region of the signalling component 340 brings signalling component 340 into contact with pushbutton 310 during operation of pushbutton 310 of switch 300. Signalling component 340 incorporates a component for producing a signal on application of pressure during operation of underlying pushbutton 310. In a preferred embodiment, signalling component 340 comprises a wireless transmitter, preferably emitting radio frequency signals, preferably powered by an incorporated battery, and incorporates a switching component operable by the application of pressure. In a preferred embodiment switching component of signalling component 340 comprises a microswitch. Operation of said switching component causes a wireless signal to be emitted, which may then be received by an external monitoring device.

In a further preferred embodiment, signalling component 340 comprises a thin component, preferably integral with membrane 330. In this embodiment, signalling component 340 comprises, for example, a resistive or capacitive touch sensor operable as a switching component of signalling component 340.

In accordance with a preferred embodiment of the invention, FIG. 4 illustrates a system 400 within which the pushbutton switch 300 of the preferred embodiment illustrated in FIGS. 3a and 3b may operate. System 400 incorporates pushbutton switch 300 controlling electrical load, for example appliance 410, and monitoring component 420, operable to receive wireless signals emitted by signalling component 340. Operation of pushbutton 310 of switch 300 causes signalling component 340 to emit a wireless signal, preferably a radio frequency signal. Preferably, monitoring component 420 is operable to receive wireless signals at the radio frequencies emitted by signalling component 340. Preferably the wireless signal incorporates a code uniquely identifying the signalling component 340. Receipt of the signal by monitoring component 420 indicates that the pushbutton 310 of switch 300 has been operated. Monitoring component 420 records a change of state of pushbutton switch 300. Where pushbutton switch 300 controls electrical supply to a monitored electrical load, for example an electrical appliance 410, a warning may be issued to personnel responsible for the appliance.

In accordance with a preferred embodiment of the invention, signalling component 340 and monitoring component 420 operate using a short range wireless technology such as that operating under the Bluetooth protocol, or other wireless protocol designed for communication within the confines of a building, for example. It will be clear to those of ordinary skill in the art that other alternative communications technology may be used without departing from the invention as claimed.

Figure 5B:
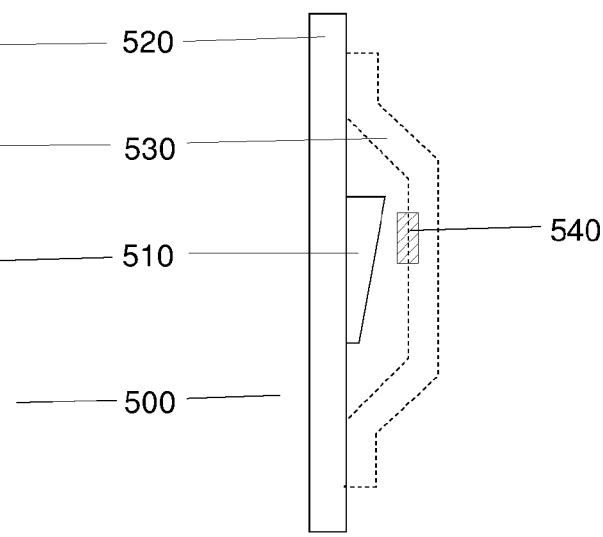
FIG. 5b is a cross-sectional elevation view of a rocker switch with a membrane overlay incorporating a signalling device in accordance with a preferred embodiment of the invention.

In accordance with a further preferred embodiment of the invention, FIG. 5a illustrates a plan view and FIG. 5b illustrates a cross-sectional elevation view of a rocker switch 500, comprising rocker 510 operating within faceplate 520, the whole being substantially covered by a membrane overlay 530. Membrane 530 incorporates signalling component 540. Signalling component 540 is positioned over one end of rocker 510, preferably over the rocker end which on depression (turning the switch off) disconnects power from the monitored electrical load, so that signalling component 540 emits a signal on the disconnection of power from the electrical load.

Figure 6A:
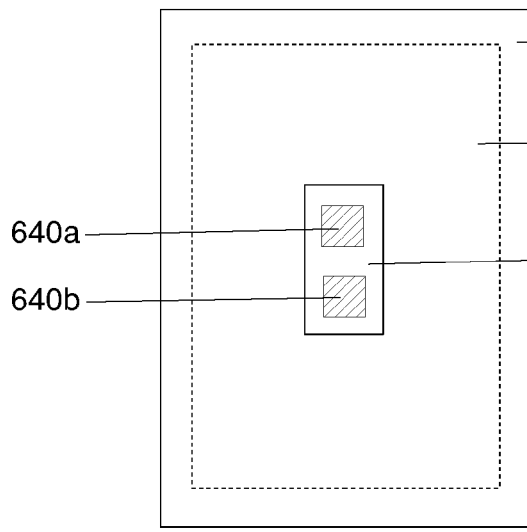
FIG. 6a is a plan view of a rocker switch with a membrane overlay incorporating two signalling devices in accordance with a preferred embodiment of the invention.
Figure 6B:
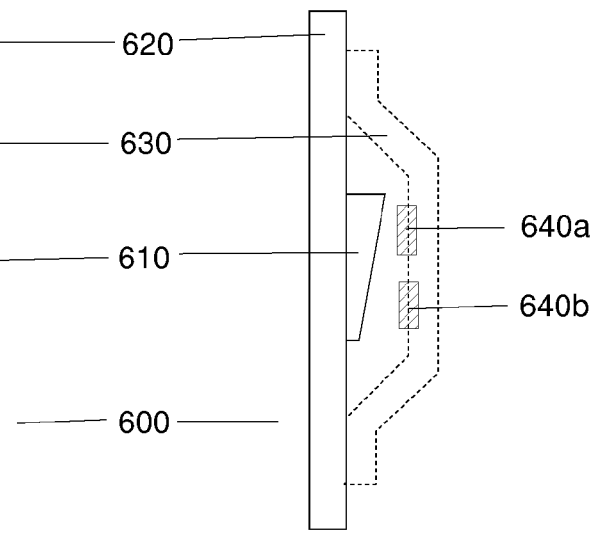
FIG. 6b is a cross-sectional elevation view of a rocker switch with a membrane overlay incorporating two signalling devices in accordance with a preferred embodiment of the invention.

In accordance with a further preferred embodiment of the invention, FIG. 6a illustrates a plan view and FIG. 6b illustrates a cross-sectional elevation view of a rocker switch 600, comprising rocker 610 operating within faceplate 620, the whole being substantially covered by a membrane overlay 630. Membrane 630 incorporates two signalling components, 640a and 640b, positioned over opposite ends of rocker 610. Therefore, in this embodiment of the present invention, a signal will be emitted by signalling component 640a when electrical power is disconnected from the electrical load by operation of rocker 610, and by signalling component 640b when electrical power is connected to the electrical load by operation of the opposite end of rocker 610. Warning will therefore be given at each state change, and not only on disconnection of power from electrical load controlled by rocker switch 600.

Figure 7A:
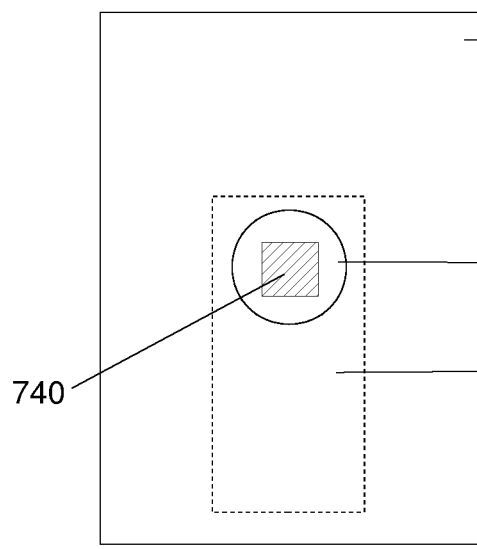
FIG. 7a is a plan view of a pushbutton switch with a partial overlay incorporating a signalling device in accordance with a preferred embodiment of the invention.
Figure 7B:
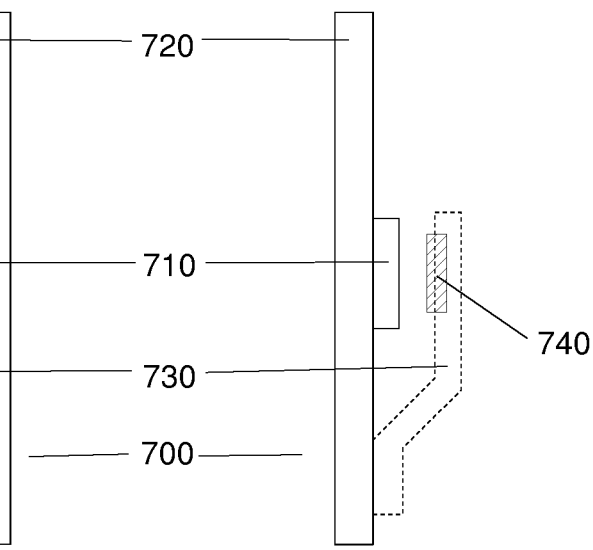
FIG. 7b is a cross-sectional elevation view of a pushbutton switch with a partial overlay incorporating a signalling device in accordance with a preferred embodiment of the invention.

In accordance with a further preferred embodiment of the invention, FIG. 7a illustrates a plan view and FIG. 7b a cross-sectional elevation view of a pushbutton switch 700, comprising pushbutton 710, operating within faceplate 720, and with a tongue-like flexible, resilient member 730 affixed at one end to the faceplate near its outer edge, and bent out, away from the faceplate 720, so that its other end sits above pushbutton 710. Signalling component 740 is embedded in or otherwise attached to the end of flexible resilient member 730 so as to be positioned above pushbutton 710, so that operation of pushbutton 710 will apply pressure to signalling component 740 positioned above pushbutton 710. Switching component of signalling component 740 will operate, resulting in emission of a signal, for example a wireless signal, by signalling component 740. In this embodiment of the invention, flexible resilient member 730 has only minimal protective function.

Figure 8A:
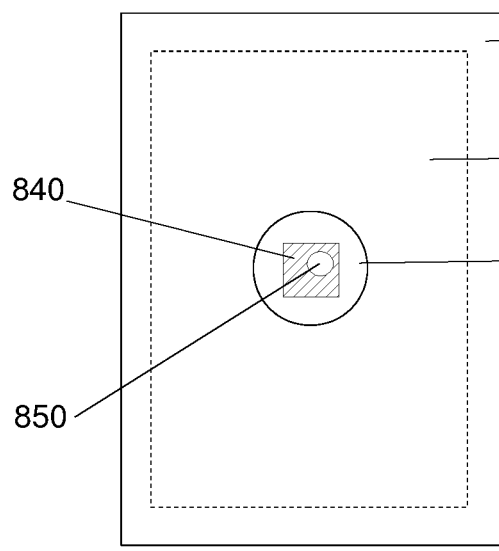
FIG. 8a is a plan view of a pushbutton switch with a membrane overlay incorporating a signalling device comprising a light or an audible warning component in accordance with a preferred embodiment of the invention.
Figure 8B:
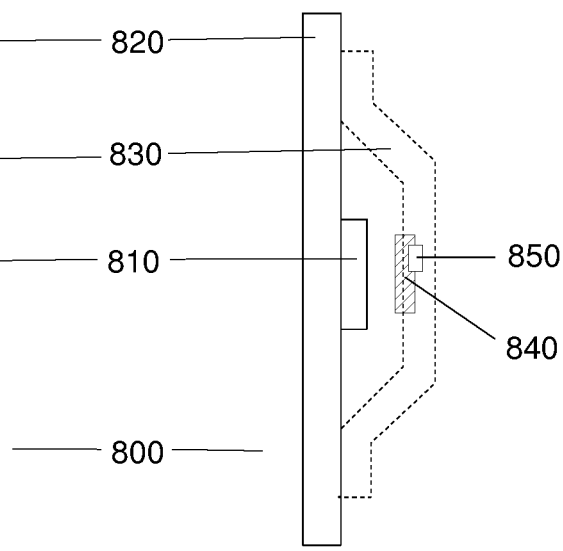
FIG. 8b is a cross-sectional elevation view of a pushbutton switch with a membrane overlay incorporating a signalling device comprising a light or an audible warning component in accordance with a preferred embodiment of the invention.

In accordance with a further preferred embodiment of the invention, FIG. 8a illustrates a plan view and FIG. 8b a cross-sectional elevation view of a pushbutton switch 800, comprising pushbutton 810 operating within faceplate 820, the whole being substantially covered by membrane overlay 830. Membrane 830 incorporates signalling component 840. Signalling component 840 is positioned over pushbutton 810 as in previous embodiments, so that operation of underlying pushbutton 810 also operates signalling component 840. In this embodiment of the present invention, signalling component 840 comprises a warning component 850, in addition to, or in the place of, a wireless transmitter. In a preferred embodiment, warning component 850 is a light set to operate, in constant or flashing mode, upon operation of signalling component 840. Warning will thus be of a visual nature and will not require specific monitoring by a wireless receiver monitoring component of previous embodiments. In a preferred embodiment, light 850 may be a light-emitting diode (LED).

In accordance with a further preferred embodiment of the invention, the embodiment described with reference to FIG. 8a and FIG. 8b comprises signalling component 840 which comprises warning component 850 which produces an audible signal on operation of underlying pushbutton 810. In this embodiment, audible warning component 850 may comprise, for example, a buzzer.

Figure 9A:
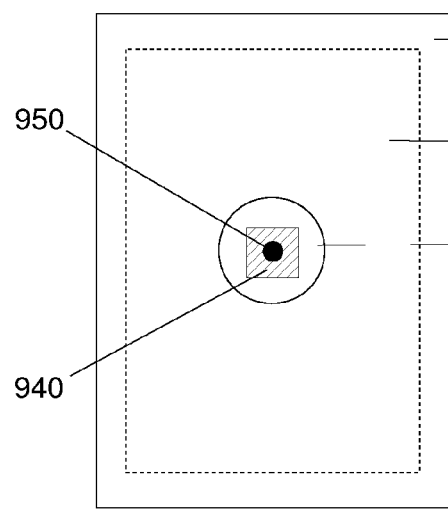
FIG. 9a is a plan view of a pushbutton switch with a flexible resilient member overlay incorporating a signalling device comprising an access hole for allowing access by a tool in accordance with a preferred embodiment of the invention.
Figure 9B:
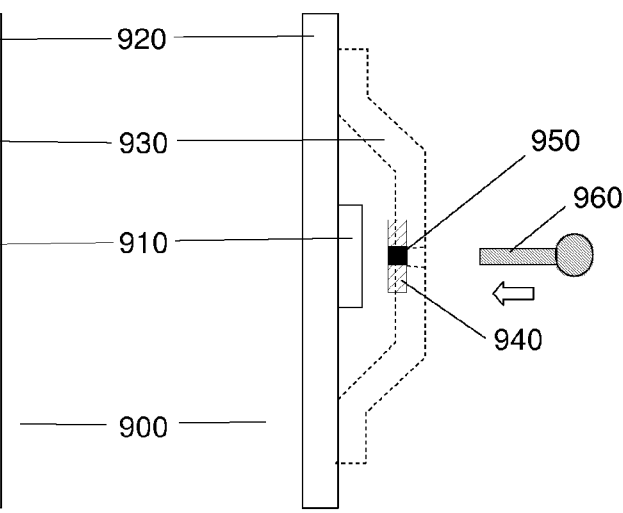
FIG. 9b is a cross-sectional elevation view of a pushbutton switch with a flexible resilient member overlay incorporating a signalling device comprising an access hole for allowing access by a tool in accordance with a preferred embodiment of the invention.

In accordance with a further preferred embodiment of the invention, FIG. 9a illustrates a plan view and FIG. 9b a cross-sectional elevation view of a pushbutton switch 900, comprising pushbutton 910 operating within faceplate 920, the whole being substantially covered by flexible resilient member 930. Member 930 incorporates signalling component 940. Signalling component 940 and member 930 incorporate an access hole 950 intended to only allow access by tool 960. For example, hole 950 may be so conformed as to be complementary to the cross-sectional shape of tool 960, so allowing tool 960 to access pushbutton 910 for operation by pushing tool 960 against pushbutton 910. In this embodiment, member 930 allows only limited flexure, so that pushbutton 910 may only be operated by use of tool 960. Insertion of tool 960 activates the signalling function of signalling component 940 to produce a signal.

In accordance with a preferred embodiment of the present invention, a method of manufacture of a flexible resilient member comprising a signalling component comprises a moulding process. The moulding process may comprise a process of compression moulding, injection moulding, blow moulding, or any other suitable moulding process. The signalling component may be incorporated in the flexible resilient member during the moulding process. In an alternative embodiment, the signalling component may be attached to the flexible resilient member after completion of the moulding process, for example by the use of an adhesive.

In accordance with a further preferred embodiment of the present invention, the flexible resilient member may be formed by a mechanical fabrication process involving for example cutting, bending or other forming method, and further comprising fastening by, for example, screws or nails, or the use of adhesive. The signalling component may be attached to the flexible resilient member after the forming process, for example by the use of adhesive.

In accordance with a further preferred embodiment of the invention, the signalling means of any of the previous embodiments comprises a rod component linking it to the underlying switch, and a further rod component connecting it to the flexible resilient member.

In accordance with a further preferred embodiment, the flexible resilient member comprises a mechanism which requires an operator to consciously reveal the underlying switch mechanism. Such mechanism may comprise a cover which is lifted, or a cover which is rotated to reveal the underlying switch.

In accordance with preferred embodiments, the flexible resilient member further comprises a signalling component which transmits a signal to a monitoring component via a wired link.

In accordance with preferred embodiments, the flexible resilient member further comprises a signalling component having a power supply provided from the mains electricity supply.

In accordance with preferred embodiments, the flexible resilient member further comprises a signalling component having a power supply provided by a rechargeable battery. In a preferred embodiment, the battery may be charged using electricity from a photovoltaic panel, said panel obtaining its light from the sun or other ambient light.

In accordance with a further preferred embodiment, flexible resilient member comprises a signalling component and further comprising construction to enforce once only operation, so that once the underlying switch is operated, the flexible resilient member must be removed before a further change of state of the underlying switch may be accomplished.

It will be clear to one skilled in the art that many improvements and modifications can be made to the foregoing exemplary embodiments without departing from the scope of the present invention.

The invention claimed is:

1. A flexible resilient member overlying a switching component of an electrical switch and attached to an external surface of said electrical switch, characterized in that:
said flexible resilient member comprises at least one signaling component operable on operation of the switching component of the electrical switch, wherein said flexible resilient member wholly overlies said electrical switch apart from a tool-shaped hole portion of said flexible resilient member that is configured to provide access by a complementary tool that is configured to operate said electrical switch.

2. The flexible resilient member as claimed in claim 1, wherein said flexible resilient member wholly overlies said electrical switch.

3. The flexible resilient member as claimed in claim 2, wherein said flexible resilient member is sealed to protect said electrical switch against foreign matter.

4. The flexible resilient member as claimed in claim 1, wherein said flexible resilient member comprises an elastomeric material.

5. The flexible resilient member as claimed in claim 1, wherein said at least one signaling component is operable to produce a wireless signal when the switching component is switched.

6. The flexible resilient member as claimed in claim 1, wherein said at least one signaling component comprises a light.

7. The flexible resilient member as claimed in claim 1, wherein said at least one signaling component comprises a component producing an audible signal.

8. The flexible resilient member as claimed in claim 1, wherein said electrical switch is a pushbutton switch.

9. The flexible resilient member as claimed in claim 1, wherein said electrical switch is a rocker switch.

10. The flexible resilient member as claimed in claim 1, wherein said at least one signaling component is positioned so as to be operable when said electrical switch is operated to connect or disconnect electrical power from an electrical load controlled by said electrical switch.

11. A system for monitoring a change of the operational state of said electrical switch as claimed in claim 1, wherein a monitoring component is operable to receive a signal emitted by said at least one signaling component.

12. The system of claim 11 wherein said monitoring component comprises a wireless receiver.

13. The flexible resilient member as claimed in claim 1, wherein the switching component is a pushbutton component.

14. The flexible resilient member as claimed in claim 1, wherein the switching component is a rocker component.

* * * * *